Patented Dec. 11, 1928.

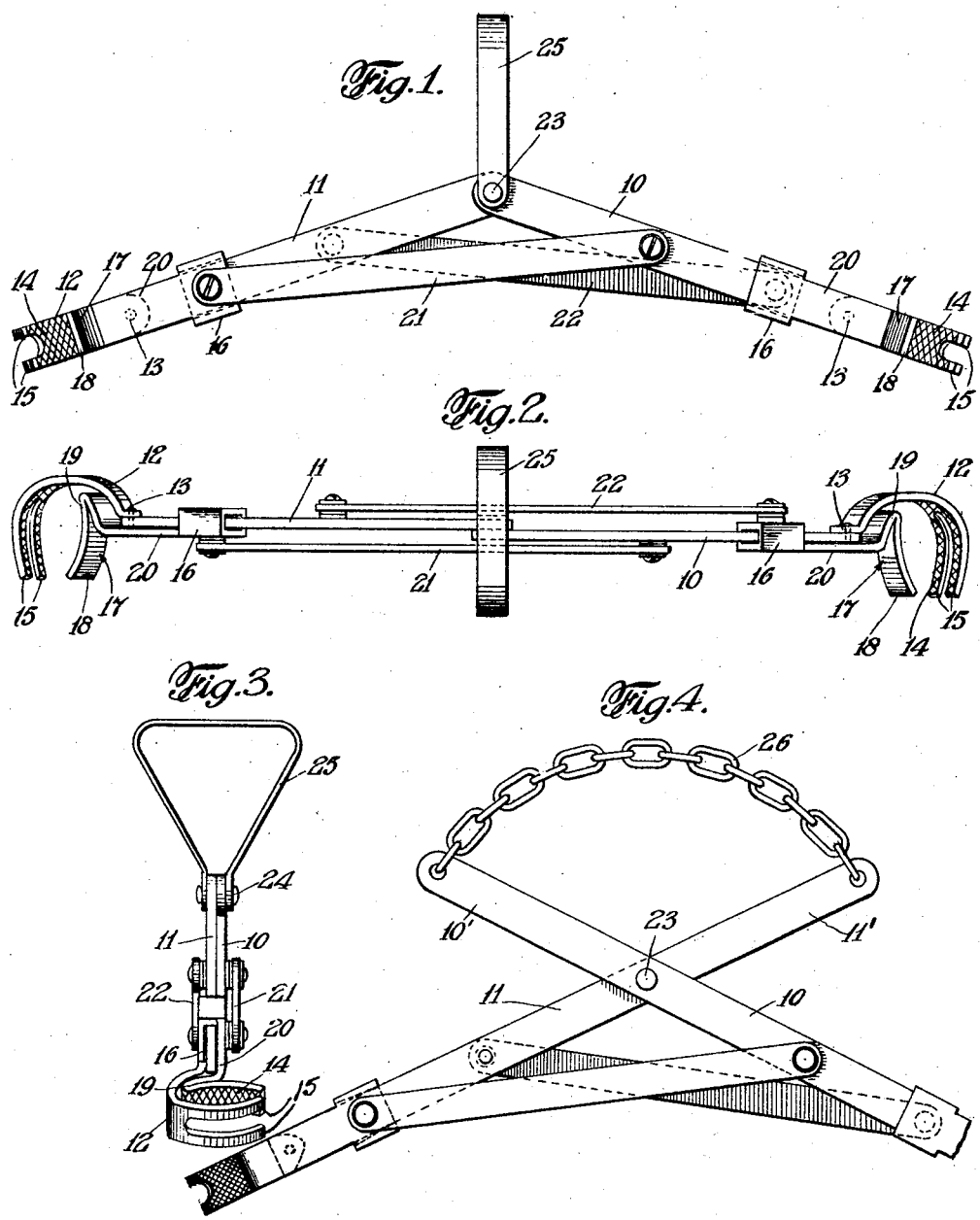

1,695,138

UNITED STATES PATENT OFFICE.

WILLIAM W. BRAINARD, OF NEW YORK, N. Y.

HOG GAMBREL.

Application filed December 12, 1923. Serial No. 680,093.

This invention relates to hog gambrels and has for one of its important objects the provision in a device of the character mentioned an improved means making possible expeditious application of the device to the animal's legs or hocks.

A further object of the invention is to provide in a device of the character mentioned an improved means for effecting a gripping action upon the animal's legs or hocks in such a way as not to bruise, tear or injure the same.

Another object of the invention is to provide a device of the character mentioned which is strong, durable, inexpensive to manufacture and reliable in operation.

Other objects and certain advantages of the invention will become apparent from the following description when taken in connection with the accompanying drawings in which—

Figure 1 is a side elevation of the device embodying my invention.

Figure 2 is a plan view of the device shown in Figure 1.

Figure 3 is an end elevation of the device.

Figure 4 is a slightly modified form of the device.

In the drawings the numeral 10 indicates an arm or supporting member to one end of which is pivotally connected a similar arm or supporting member 11. These arms, at their outer ends, are provided with substantially U-shaped gripping members 12 which are pivotally connected to the arms 10 and 11 as shown at 13. By pivotally connecting the gripping members 12 to the arms 10 and 11 provision is thereby made whereby the gripping members 12 may adjust themselves to various positions depending upon the inclination of the animal's legs when supported. In constructing the gripping members 12 the inner surfaces thereof are preferably knurled or serrated as shown at 14 in order to prevent undue slipping of the animal's legs, as will be readily appreciated. If desired the gripping members 12 may be bifurcated thus providing a pair of spaced fingers 15, the spacing of which permits a certain amount of the animal's flesh to enter between the fingers 15 when pressure is applied thereto through the instrumentality of means hereinafter more particularly described.

Upon the arms 10 and 11 are mounted runners or guides 16 which are adapted to slide freely thereupon. These runners or guides are provided with gripping elements 17, adapted to cooperate with the gripping members 12 and comprise arcuate shaped arms 18 which are bent upon themselves as shown at 19 in order that the outward thrust transmitted to the gripping elements 17 may be applied to the animal's legs in or substantially in a central plane passed longitudinally through the device. The arms 18 are preferably formed integral with shanks 20 suitably connected to the runners or guides 16. These guides are in turn pivotally connected to thrust links 21 and 22 which are, at their outer ends, pivotally connected respectively to the arms 10 and 11 intermediate their outer ends and their common point of pivotal connection shown at 23. The pivotal connection afforded between the arms 10 and 11 is made by means of a pin or rivet 24 passed through the adjoining or adjacent ends of the arms to which rivet is pivotally connected a bail 25 by which the device is adapted to be suspended.

In the modified form of the invention shown in Figure 4 I have extended the arms 10 and 11 beyond their point of common pivotal connection 23 in order to provide auxiliary levers 10' and 11', to the outer ends of which is connected a chain 26 the function of which, as will be readily appreciated, corresponds to that of the bail 25.

The device embodying my invention is particularly adapted to be used in slaughter houses as a means for suspending slaughtered animals such as hogs and the like either while being transported from one portion of the slaughter house to another or while undergoing a particular process in the course of preparation for market as well as for suspending the animal after having undergone the final step in the dressing and preparation for market. When it is desired to attach the gambrel the arms 10 and 11 are so moved with respect to each other that they assume maximum extended positions in which case the gripping elements 17 are so located with respect to the gripping members 12 as to permit the introduction of the animal's legs or hocks into the spaces afforded between the gripping members 12 and gripping elements 17 whereupon an upward pull, for example, when considering Figure 1 is exerted upon the arms 10 and 11 at their point of pivotal connection 23 thus causing the arms 10 and 11 to move from their respective extended positions into an angular relation with respect to each other. Upon such movement the runners or guide members 16 are caused to move outwardly upon the arms 10 and 11 thereby effecting a relative movement between the gripping members 12 and gripping elements 17, the relative movement being to such a degree that the animal's legs or hocks located between the gripping members and gripping elements are thereby clamped by the cooperation between these elements. When pressure is applied to the animal's legs a portion of the flesh thereof by necessity enters the space afforded between the fingers 15 thereby effectively preventing a slipping of the device when clamped upon the animal. The device when clamped in position as described is further prevented from slipping by reason of the serrated faces 14 of the gripping members and elements 12 and 17, respectively.

Having thus described my invention I claim:

1. A hog gambrel comprising pivotally connected arms, gripping members associated with said arms, said gripping members being bifurcated to provide a plurality of fingers, means movable with respect to said gripping members and adapted to cooperate with said gripping elements for effecting a relative movement between said gripping members and elements, said means being in the form of links pivotally connected to said gripping elements and said pivotally connected arms.

2. A hog gambrel comprising pivotally connected supporting arms, gripping members associated with said arms, guide members slidable upon said arms, gripping elements carried by said guide members, and means for effecting a relative movement between said gripping members and elements upon relative movement of said arms, said means being in the form of links pivotally connected to said guides and arms.

3. A hog gambrel comprising pivotally connected arms, gripping members associated with said arms, gripping elements supported by said arms and slidable thereon, means for effecting relative movement between said gripping members and gripping elements, and supporting means connected to the gambrel at corresponding ends of said arms and adapted to effect a relative movement between said gripping elements and members by moving said arms with respect to each other.

4. A hog gambrel comprising arms pivotally connected adjacent one end of each arm, said ends extending beyond said pivot, gripping members associated with said arms, gripping elements supported by said arms and slidable thereon, means for effecting relative movement between said gripping members and gripping elements, and supporting means connected to the ends of said arms beyond said pivot and adapted to effect a relative movement between said gripping elements and members by moving said arms with respect to each other, said supporting means being in the form of a flexible element.

In testimony whereof, I have affixed my signature to this specification.

WILLIAM W. BRAINARD.